US012756534B2

(12) United States Patent
Ying et al.

(10) Patent No.: US 12,756,534 B2
(45) Date of Patent: *Oct. 6, 2026

(54) CLOCK RECOVERY OPTIMIZATION IN DATA INTERFACES

(71) Applicant: PARADE TECHNOLOGIES, LTD., San Jose, CA (US)

(72) Inventors: Canruo Ying, Santa Clara, CA (US); Yi-Han Cheng, Hsinchu (TW)

(73) Assignee: Parade Technologies, Ltd., San Jose, CA (US)

(*) Notice: Subject to any disclaimer, the term of this patent is extended or adjusted under 35 U.S.C. 154(b) by 39 days.

This patent is subject to a terminal disclaimer.

(21) Appl. No.: 18/937,975

(22) Filed: Nov. 5, 2024

(65) Prior Publication Data

US 2025/0062889 A1 Feb. 20, 2025

Related U.S. Application Data

(63) Continuation of application No. 18/301,152, filed on Apr. 14, 2023, now Pat. No. 12,137,157.

(51) Int. Cl.
*H04L 7/00* (2006.01)

(52) U.S. Cl.
CPC .................................. *H04L 7/0087* (2013.01)

(58) Field of Classification Search
CPC ............................ H04L 7/0087; H04L 7/0331
See application file for complete search history.

(56) References Cited

U.S. PATENT DOCUMENTS 4,773,085 A * 9/1988 Cordell ................. H03L 7/0891 331/25
7,149,914 B1 * 12/2006 Asaduzzaman ........... H03L 7/18 713/503
8,958,513 B1 * 2/2015 Novellini .............. H04L 7/0337 375/373
11,909,405 B1 * 2/2024 Grimaldi ................. H03L 7/085
2002/0158621 A1 * 10/2002 Tao ....................... H03L 7/0891 324/76.35
2003/0048139 A1 * 3/2003 Chien ..................... H03L 7/199 331/25

(Continued)

*Primary Examiner* — Freshteh N Aghdam
(74) *Attorney, Agent, or Firm* — Morgan, Lewis & Bockius LLP

(57) ABSTRACT

This application is directed to controlling bandwidths of clock recovery circuit in an electronic device. The electronic device includes a clock recovery circuit and a bandwidth controller coupled to the clock recovery circuit. The clock recovery circuit is configured to receive a data signal carrying a stream of data bits according to a reference clock frequency and recover a clock signal from the data signal. The bandwidth controller is configured to control the clock recovery circuit to start with a pull-in bandwidth, settle at a target bandwidth, and apply an intermediate bandwidth between the pull-in bandwidth and target bandwidth. The intermediate bandwidth is greater than the target bandwidth and less than the pull-in bandwidth. In some implementations, the bandwidth controller controls the clock recovery circuit to apply one or more additional bandwidths to the clock signal after the pull-in bandwidth and the intermediate bandwidth and before the target bandwidth.

20 Claims, 11 Drawing Sheets

(56) References Cited

U.S. PATENT DOCUMENTS

| | | | | |
|---|---|---|---|---|
| 2004/0004962 | A1 * | 1/2004 | Glazko | H04B 1/7075<br>375/E1.003 |
| 2013/0051437 | A1 * | 2/2013 | Sai | H03L 7/087<br>327/117 |
| 2014/0112378 | A1 * | 4/2014 | Ji | H04L 27/266<br>375/344 |

* cited by examiner

CLOCK RECOVERY OPTIMIZATION IN DATA INTERFACES

RELATED APPLICATIONS

This application is a continuation of U.S. patent application Ser. No. 18/301,152, titled "Clock Recovery Optimization in Data Interfaces," filed Apr. 14, 2023, which is incorporated by reference in its entirety.

TECHNICAL FIELD

The disclosed implementations relate generally to data transmission technology including, but not limited to, methods, systems, and devices for recovering clock signals in data communicated between two electronic devices or components using a high-speed serial expansion bus.

BACKGROUND

Many electronic devices are physically coupled to each other and communicate with each other using data links and interfaces that comply with high-speed serial computer expansion bus standards (e.g., Peripheral Component Interconnect (PCI) Express). These bus standards allow application of retimers and redrivers to extend a channel reach at a high data speed. A redriver is an analog extension device designed to boost portions of a signal to counteract attenuation caused by signal propagation over a physical interconnect of a corresponding data link. A retimer is a mixed-signal device that is standard-aware and has an ability to fully recover the data, extract the embedded clock, and retransmit a fresh copy of the data using a clean clock. Compared with the redriver, the retimer actively participates in applying the bus standard to implement negotiation, timeouts, bit manipulation, jitter resetting, signal equalization, skew correction, and many other functions. Clock and data recovery (CDR) circuits are commonly used in retimers of high speed data links and interfaces that are designed to meet stringent bit error rate (BER) specifications. These BER specifications require jitter-tolerant CDR circuits. Furthermore, these high speed data links and interfaces are required to be functional with spread spectrum clocking (SSC) to meet electromagnetic interference (EMI) regulations. For economic reasons, the same CDR circuit is designed to be suitable for a variety of applications having different data rates and different signal modulation schemes. For these reasons, the CDR circuit applied in a high speed data link or interface is required to be highly configurable and robust while offering a high pull-in frequency range and a high jitter tolerance.

SUMMARY

This application is directed to methods, electronic systems, electronic devices, electronic circuits, data links, data ports, and data interfaces that control a bandwidth of CDR circuit that recovers a clock signal to meet requirements of a pull-in frequency range and a jitter tolerance. Existing solutions often endeavor to address these two requirements concurrently by pushing limits of the CDR circuit. Techniques increasing the pull-in frequency range of the clock signal also increase the bandwidth of the CDR circuit, which may compromise the jitter tolerance of the CDR circuit at high frequencies (e.g., jitter frequency beyond the CDR bandwidth). Conversely, improving the jitter tolerance by limiting the CDR bandwidth often leads to reduction of the pull-in frequency range. In various implementations of this application, a bandwidth controller is coupled to the CDR circuit and applied to control the CDR circuit to start with a pull-in bandwidth, settle at a target bandwidth, and apply an intermediate bandwidth between the pull-in bandwidth and target bandwidth. The intermediate bandwidth is greater than the target bandwidth and less than the pull-in bandwidth. By these means, the CDR circuit prioritizes the pull-in frequency range initially to function properly, and is then fine-tuned to satisfy the jitter tolerance gradually, thereby addressing pull-in frequency range and jitter tolerance issues separately.

In one aspect, an electronic device includes clock recovery circuit and a bandwidth controller coupled to the clock recovery circuit. The clock recovery circuit is configured to receive a data signal and recover a clock signal from the data signal. The data signal carries a stream of data bits according to a reference clock frequency. The bandwidth controller configured to control the clock recovery circuit to start with a pull-in bandwidth, settle at a target bandwidth, and apply an intermediate bandwidth between the pull-in bandwidth and target bandwidth. The intermediate bandwidth is greater than the target bandwidth and less than the pull-in bandwidth. In some implementations, the bandwidth controller is configured to control the clock recovery circuit to apply one or more additional bandwidths between the intermediate bandwidth and the target bandwidth, and the intermediate bandwidth and the one or more additional bandwidths are sequentially applied to the clock recovery circuit after the pull-in bandwidth and before the target bandwidth.

In some implementations, the clock recovery circuit has a target track mode in which the clock signal is generated within the target bandwidth of the reference clock frequency and has a jitter within a target jitter tolerance, and the target bandwidth is configured to be determined based on the target jitter tolerance. In some implementations, the clock recovery circuit has a pull-in mode in which a frequency of the clock signal starts within the pull-in bandwidth and increases within a pull-in frequency range of the reference clock frequency to gradually approach the reference clock frequency, and the pull-in bandwidth is determined based on the pull-in frequency range. In some implementations, the clock recovery circuit has an intermediate track mode in which the clock signal is generated within the intermediate bandwidth of the reference clock frequency and has a BER that is greater than a target BER tolerance of the clock signal.

In another aspect, a non-transitory computer-readable storage medium stores one or more programs to be executed by one or more processors. The one or more programs include instructions for implementing any of the above methods for controlling clock recovery in a data interface or a data communication link.

In yet another aspect, an electronic device includes one or more processors and memory storing one or more programs configured for execution by the one or more processors. The one or more programs include instructions for implementing any of the above methods for controlling clock recovery in a data interface or a data communication link.

In yet another aspect, a method is implemented by an electronic system for controlling clock recovery in a data interface. The method includes obtaining a data signal carrying a stream of data bits according to a reference clock frequency, applying clock recovery circuit to recover a clock signal from the data signal, and controlling the clock recovery circuit to start with a pull-in bandwidth, settle below a target bandwidth, and apply an intermediate bandwidth between the pull-in bandwidth and target bandwidth. The intermediate bandwidth is greater than the target bandwidth and less than the pull-in bandwidth.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
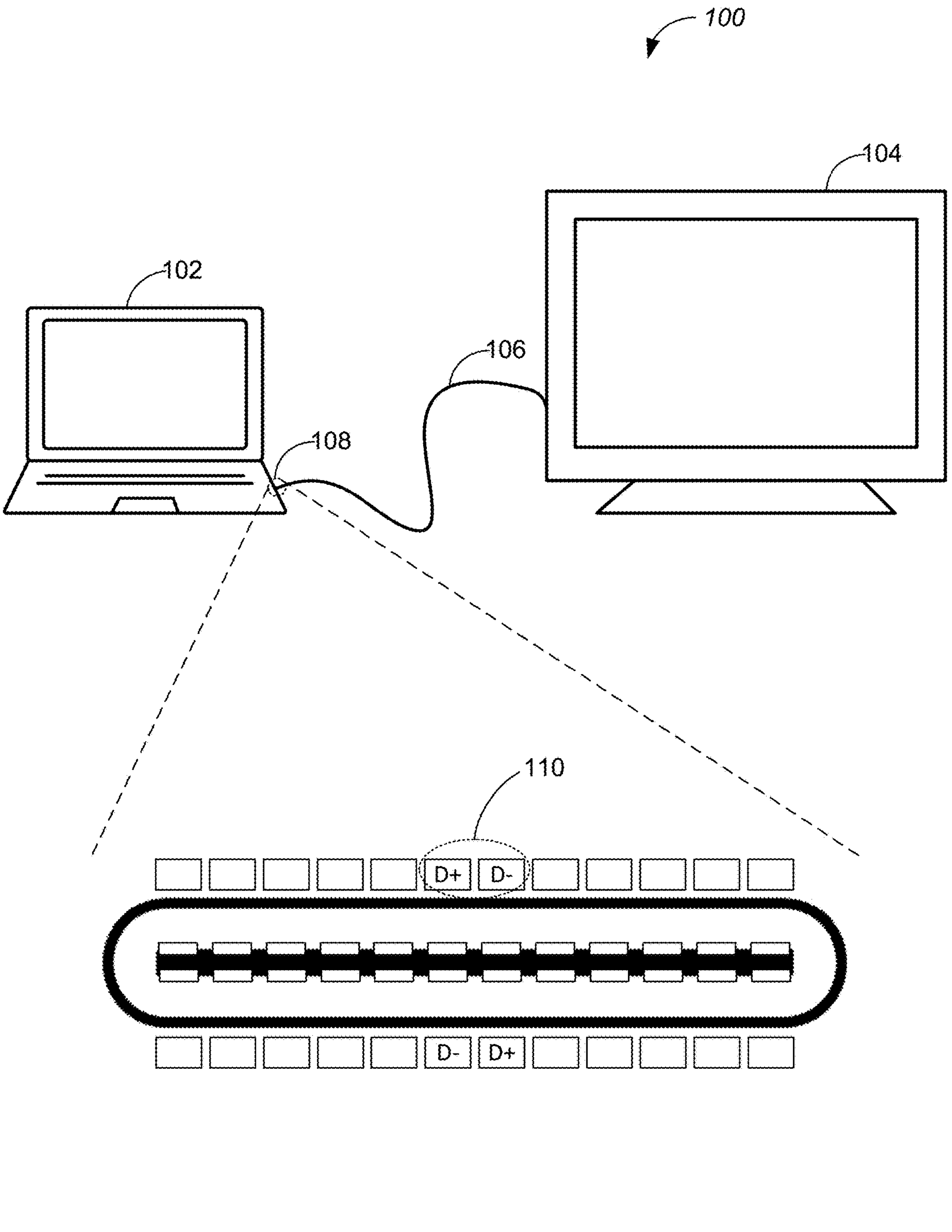
FIG. 1 is a block diagram of an example electronic system in which electronic devices are electrically via a data link, in accordance with some implementations.

FIG. 1 is a block diagram of an example electronic system 100 in which a first electronic device 102 is electrically coupled to a second electronic device 104 via a data link 106, in accordance with some implementations. The first electronic device 102 and second electronic device 104 are configured to exchange data via the data link 106. In an example, the first electronic device 102 includes a video source, and the second electronic device 104 includes a display device. The display device has a screen configured to display visual content provided by the first electronic device 102 via the data link 106. In another example not shown, the first electronic device 102 includes a desktop computer, and the second electronic device 104 includes a mobile phone that exchanges data with the desktop computer via the data link 106. Examples of the electronic devices 102 and 104 include, but are not limited to, a desktop computer, a laptop computer, a tablet computer, a video player, a camera device, a gameplayer device, or other formats of electronic devices which are configured to provide data or receive data. Video data, audio data, text, program data, control data, configuration data, or any other data are transmitted between the first and second electronic devices 102 and 104 via the data link 106.

The data link 106 includes two connectors 108 at two of its ends. The two connectors 108 are configured to connect the data link 106 to respective connectors 108 of the first electronic device 102 and second electronic device 104. For example, the connector 108 is a DisplayPort connector having a digital display interface developed by a consortium of personal computer and chip manufacturers and standardized by the Video Electronics Standards Association (VESA). The DisplayPort connector is configured to connect the data link 106 to the first electronic device 102 and carry video, audio, and control data according to a data communication protocol. In another example, the connector 108 is a universal serial bus (USB) connector, e.g., configured to connect a computer to a peripheral device. Exemplary types of the USB connector include, but are not limited to, USB-A, USB-B, USB-C, USB Micro-A, USB Micro-B, USB Mini-B, USB 3.0A, USB 3.0B, USB 3.0 Micro B, and USB Micro-AB. Further, a data communication protocol of USB4 is applied to communicate data using a USB-C connector, thereby providing a throughput of up to 40 Gbps, power delivery of up to 100 W, support for 4K and 5K displays, and backward compatibility with USB 3.2 and USB 2.

In some implementations, the connector 108 includes a bidirectional channel for communicating a stream of data between the first and second electronic device 102 and 104. The bidirectional channel of the connector 108 includes two data lanes and a pair of differential pins 110 coupled to the two data lanes. The pair of differential pins 110 are configured to receive a differential input signal from the first electronic device 102 or the second electronic device 104, and the differential input signal carries a serial data command or serial content data (e.g., video or audio data) that are communicated via the two data lanes of the connector 108. As such, the two data lanes and pair of differential pins 110 of the connector 108 are configured to facilitate bidirectional communication between the first electronic device

102 and the second electronic device 104. The bidirectional channel is a data channel or an auxiliary channel. Specifically, the auxiliary channel of the connector 108 is used for communication of additional serial data beyond video and audio data, such as consumer electronics control (CEC) commands. In some implementations, the pair of differential pins 110 is coupled to a dedicated set of twisted-pair wires configured to carry two input signals of the differential input signal.

Each connector 108 of the data link 106 is configured to be coupled to a respective connector 108 of the first electronic device 102 and a respective connector 108 of the second electronic device 104. Each connector 108 of the data link 106 is bidirectional, so is each respective connector 108 of the electronic devices 102 and 104. When the connector 108 of the data link 106 is coupled to the first or second electronic device 102 or 104, the pair of differential pins 110 of the connector 108 of the data link 106 are physically and electrically coupled to a pair of differential pins 110 of the connector 108 of the first or second electronic device 102 or 104. The pair of differential pins 110 of the connector 108 of the first or second electronic device 102 or 104 is configured to receive data from, or transmit data to, the differential pins 110 of the connector 108 of the data link 106.

Figure 2:
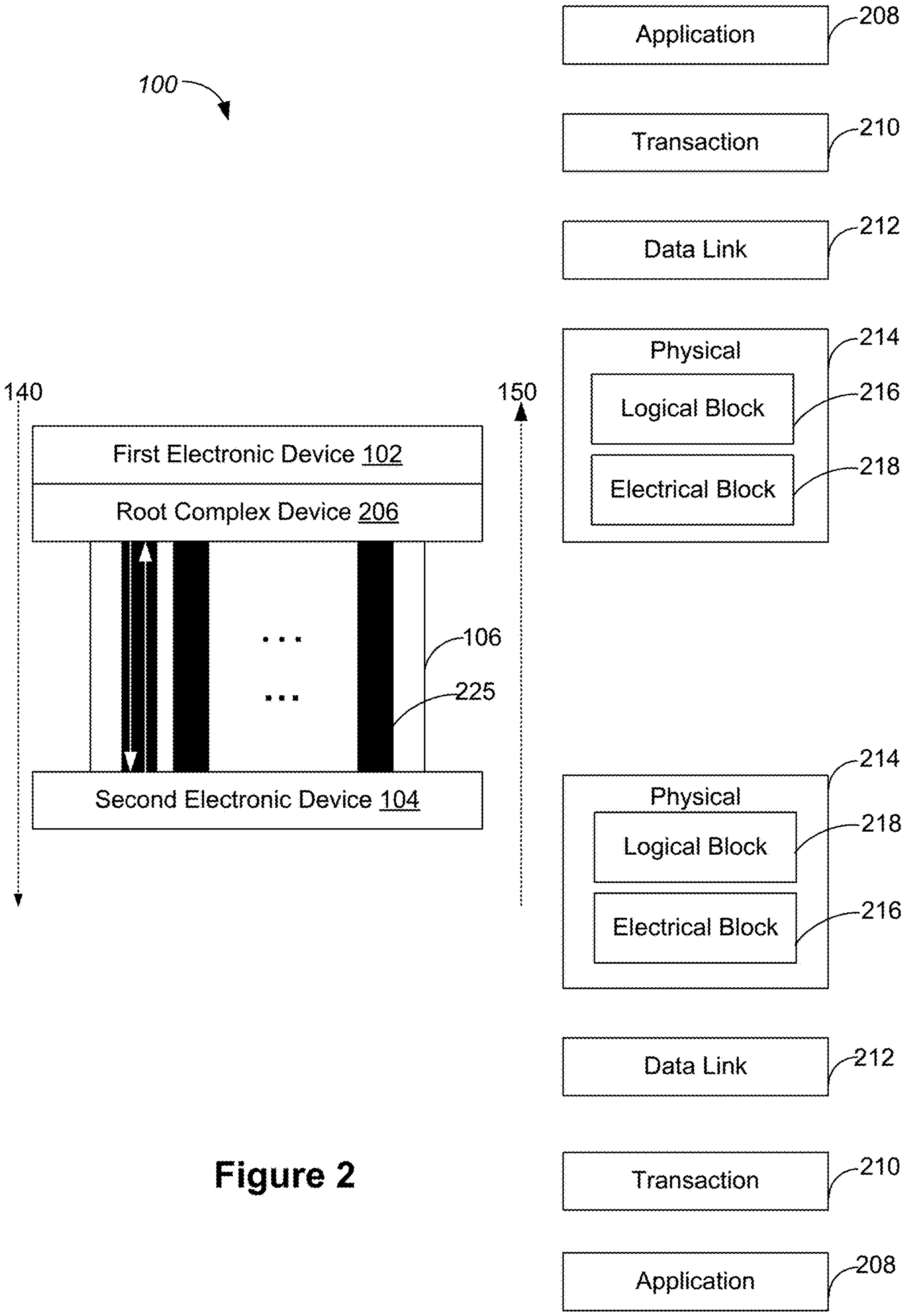
FIG. 2 is an example PCI Express electronic system in which a first electronic device or component is electrically coupled to a second electronic device or component via a data link, in accordance with some implementations.

FIG. 2 is an example PCI Express electronic system 100 in which a first electronic device or component 102 is electrically coupled to a second electronic device or component 104 via a data link 106, in accordance with some implementations. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving from the second electronic device 104. The connection port is optionally formed on a mother board of the personal computer. The data link 106 complies with PCI Express (i.e., PCIe), which is a high-speed serial computer expansion bus standard, and provides an interface to communicate data packets between the first and second electronic devices 102 and 104 in compliance with the PCI Express. The data link 106 is a serial data bus including one or more data transmission channels 225. Each channel 225 includes two wire sets for transmitting and receiving data packets, thereby supporting full-duplex communication between the first and second electronic devices 102 and 104. In some examples, the data link 106 has 1, 4, 8, or 16 channels 225 coupled in a single data port of the data link 106. For each lane, the two wire sets correspond to a downstream data direction 140 or an upstream data direction 150 defined with respect to the first electronic device 102. Optionally, each wire set includes two wires for carrying a pair of differential signals.

In some implementations, the first electronic device 102 includes or is coupled to a root complex device 206 that is further coupled to the data link 106. The root complex device 206 is configured to generate requests for transactions including a series of one or more packet transmissions on behalf of the first electronic device 102. Examples of the transactions include, but are not limited to, Memory Read, Memory Read Lock, IO Read, IO Write, Configuration Read, Configuration Write, and Message. In some implementations, the first electronic device 102 is coupled to one or more additional electronic devices besides the second electronic device 104. The data link 106 includes one or more switch devices to couple the root complex device 206 of the first electronic device 102 to multiple endpoints including the second electronic device 104 and additional electronic devices not shown in FIG. 1.

PCI Express is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 of PCI Express controls link training and electrical (analog) signaling, and includes a logical block 116 and an electrical block 118. The logic block 116 defines ordered data sets in training states (e.g., TS1 and TS2), and the electrical block 118 defines eye diagram characteristics and analog waveforms. Each layer of the layered model includes first specifications for a transmitting end where a root complex device 206 is coupled and second specifications for a receiving end where a peripheral component (i.e., the second electronic device 104) is coupled.

As high frequency signals are transmitted within the channels 225 of the data link 106, these signals are distorted and spread over sequential symbols and result in inter symbol interferences (ISI) and bit errors at the receiving end of the second electronic device 104. These ISI and bit errors can be suppressed by a finite impulse response (FIR) filter 340 (FIG. 3) that is coupled serially on a path of the data link 106 and configured with equalization settings using an equalization procedure. The equalization procedure is implemented when a high speed data transfer rate needs to be initialized, when an equalization request is issued from the application layer 208, or when a BER exceeds a data error tolerance. In some implementations, initiation and termination of the equalization procedure are detected on the physical layer 214 based on data packets transferred over the data link 106.

Figure 3:
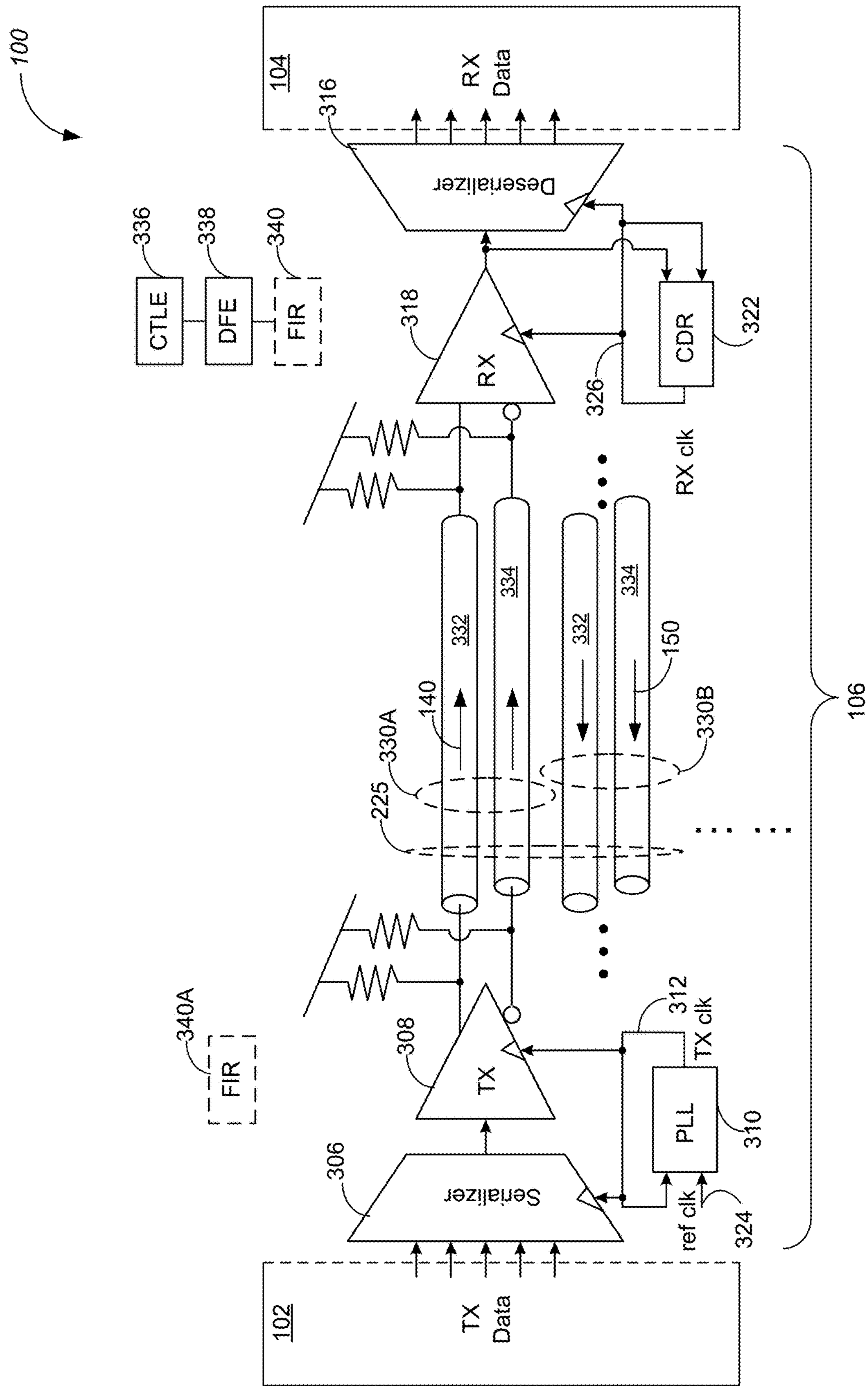
FIG. 3 is a block diagram an example electronic system in which a first electronic device or component is electrically coupled to a second electronic device or component via a data link, in accordance with some implementations.

FIG. 3 is a block diagram of another example electronic system 100 in which a first electronic device or component 102 is electrically coupled to a second electronic device or component 104 via a data link 106, in accordance with some implementations. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving data from the second electronic device 104. The connection port is optionally formed on a mother board of the personal computer. In some implementations, the data link 106 complies with a high-speed serial computer expansion bus standard (e.g., PCI Express (PCIe), USB 4) and provides an interface to communicate data packets between the first and second electronic devices 102 and 104 in compliance with the bus standard. The data link 106 is a serial data bus including one or more data channels 225. In some implementations, each data channel 225 includes two wire sets 330A and 330B (also called two data lanes) for transmitting and receiving data packets, respectively, thereby supporting full-duplex communication between the first and second electronic devices 102 and 104. In some examples, the data link 106 has 1, 4, 8, or 16 channels coupled in a single data port of the data link 106. For each data channel 225, the two wire sets 330A and 330B correspond to a downstream data direction 140 and an upstream data direction 150 defined with respect to the first electronic device 102, respectively. Optionally, each wire set 330A or 330B includes two respective wires 332 and 334 for carrying a pair of differential signals.

In some implementations, the first electronic device 102 includes or is coupled to a root complex device (not shown) that is further coupled to the data link 106. The root complex device is configured to generate requests for transactions including a series of one or more packet transmissions on behalf of the first electronic device 102. Examples of the transactions include, but are not limited to, Memory Read, Memory Read Lock, Input Output (IO) Read, IO Write, Configuration Read, Configuration Write, and Message. In some implementations, the first electronic device 102 is coupled to one or more additional electronic devices besides the second electronic device 104. The data link 106 includes one or more switch devices to couple the root complex device of the first electronic device 102 to multiple endpoints including the second electronic device 104 and additional electronic devices not shown in FIGS. 1 and 2.

A data transmission protocol (e.g., PCI Express, USB4 v2.0, DisplayPort 2.1) is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 controls link training and electrical (analog) signaling, and includes a logical block and an electrical block. The logic block 216 defines ordered data sets in training states, and the electrical block 218 defines eye diagram characteristics and analog waveforms. Each layer of the layered model includes first specifications for a transmitting side where a root complex device is coupled and second specifications for a receiving side where a peripheral component (i.e., the second electronic device 104) is coupled.

As signals are transmitted within the wire sets 330 of each data channel 225 of the data link 106, the signals are distorted and spread over sequential symbols and result in inter symbol interferences (ISI) and bit errors at the receiving side of the second electronic device 104. In some implementations, these ISI and bit errors can be suppressed by a finite impulse response (FIR) filter 340 that is coupled serially on a path of the data link 106 and configured with equalization settings using an equalization procedure. For example, an equalization procedure is implemented when a high speed data transfer rate needs to be initialized, when an equalization request is issued from the application layer, or when a BER exceeds a data error tolerance.

The electronic system 100 includes a serializer and deserializer (SERDES) system corresponding to the data link 106. The SERDES system of the data link 106 includes a serializer 306, a transmitter 308, the data channel 225, a receiver 318, and a deserializer 316. The serializer 306 converts parallel data received from the first electronic device 102 to serial data. The transmitter 308 sends the serial data to the data channel 225. The receiver 318 processes the serial data and send the processed serial data to the deserializer 316, which converts the serial data back to the parallel data for the second electronic device 104. On a transmitting side, a phase lock loop 310 generates a transmitter clock signal 312 based on a reference clock signal 324, and the transmitter clock signal 312 is applied to control serialization of the data to be transmitted by the data channel 225 of the data link 106.

On a receiving side, a clock data recovery (CDR) circuit 322 is used to recover a receiver clock signal 326 from the serial data received via the data channel 225 and compensate for a variation of signal amplitudes caused by a loss and other factors in this data channel 225. The receiver clock signal 326 is used with the receiver 318 and deserializer 316 to condition the serial data received via the data channel 106 and regenerate the parallel data from the serial data. During this process, the receiver 318 is configured to reduce signal distortion, data spreading over sequential symbols, inter symbol interferences, and resulting bit errors of the serial data on the receiving side of the second electronic device 104. Specifically, in some implementations, the receiver 318 includes a continuous time linear equalizer (CTLE) 336, a decision feedback equalizer (DFE) 338, and an FIR filter 340. The CTLE 336 is configured to selectively attenuate low frequency signal components, amplify signal components around the Nyquist frequency, and remove higher frequency signal components to generate filtered serial data. The DFE 338 is configured to further amplify the filtered serial data, and recover one or more data bits at each clock switching edge or during each clock cycle. The one or more recovered data bits form data packets. The FIR filter 340 has a plurality of equalization settings (e.g., FIR coefficients), and is applied to improve signal quality of the data packets via digital signal conditioning (e.g., via high frequency filtering in a digital domain).

This application is directed to controlling clock data recovery in the CDR circuit 322 for a data communication channel. Specifically, the CDR circuit 322 is re-configured to include a bandwidth controller and clock recovery circuit. The clock recovery circuit receives a data signal and recover a clock signal 326 from the data signal, and the data signal carries a stream of data bits according to a reference clock frequency. The bandwidth controller controls the clock recovery circuit to start with a pull-in bandwidth, settle at a target bandwidth, and apply an intermediate bandwidth between the pull-in bandwidth and target bandwidth. The intermediate bandwidth is greater than the target bandwidth and less than the pull-in bandwidth. In some implementations, the bandwidth controller controls the clock recovery circuit to apply one or more additional bandwidths between the intermediate bandwidth and the target bandwidth. The intermediate bandwidth and the one or more additional bandwidths are sequentially applied to the clock recovery circuit after the pull-in bandwidth and before the target bandwidth. For example, the pull-in bandwidth, intermediate bandwidth, one or more additional bandwidths, and target bandwidths form an arithmetic sequence or geometric sequence. By these means, a fundamental tension between a pull-in frequency range and a jitter tolerance is relaxed between using intermediate or additional bandwidths between a start and an end of a clock recovery process, thereby allowing clock recovery to be implemented efficiently and with a high success rate.

Figure 4:
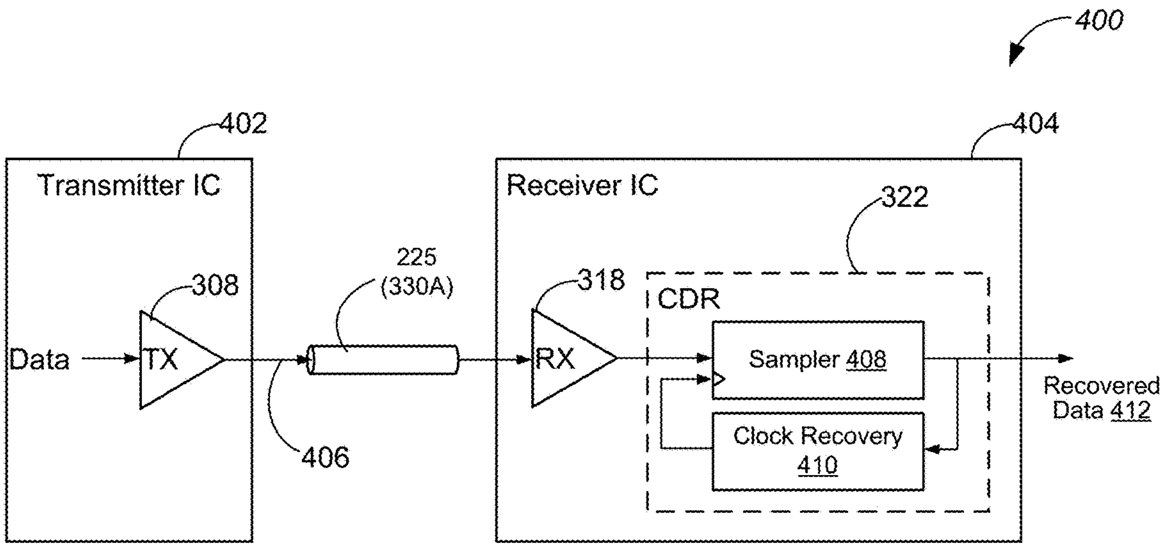
FIG. 4 is a block diagram of an example high speed communication link, in accordance with some implementations.

FIG. 4 is a block diagram of an example high speed communication link 400, in accordance with some implementations. The high speed communication link 400 includes transmitter integrated circuit (IC) 402, receiver IC 404, and a wire set 330A of a data channel 225 linking the transmitter IC 402 to the receiver IC 404. The transmitter IC 402 generates an input data signal 406 carrying a stream of data bits according to a reference clock frequency (e.g., a reference clock signal 324 in FIG. 3), and the data channel 225 passes the data signal 406 from the transmitter IC 402 to the receiver IC 404. The receiver IC 404 includes a receiver 318 and CDR circuit 322, and is configured to generate an output data signal 412 including the stream of data bits in the input data signal 406. The CDR circuit 322 further includes a sampler 408 and a clock recovery circuit 410. In some implementations, the receiver 318 includes an analog front end applying one or more analog equalizers to compensate for a loss from the data channel 225. In some implementations, the CDR circuit 322 is implemented based on one of: a phase-locked loop (PLL), a delay-locked loop (DLL), and a phase interpolator (PI).

In some implementations, the CDR circuit 322 satisfies a BER requirement corresponding to a jitter tolerance. Additionally, the CDR circuit 322 complies with a communication interface standard (e.g., PCIe, USB4), is functional with spread spectrum clocking (SSC), and satisfies an electromagnetic interference (EMI) requirement. Under some circumstances, the CDR circuit 322 is configured to be applied in two or more data interfaces having different data rates and signal modulation schemes. The CDR circuit 322 is configurable, e.g., by offering a pull-in frequency range that is greater than a pull-in frequency range threshold and a jitter tolerance that is better than a jitter tolerance threshold. In some implementations of this application, the CDR circuit 322 is optimized in both of the pull-in frequency range and jitter tolerance. Specifically, a bandwidth controller (e.g., 604 in FIG. 6) is included in or coupled to clock recovery circuit 410 of the CDR circuit 322, and controls the CDR circuit 322 to start with a pull-in bandwidth $BW_P$, settle at a target bandwidth $BW_T$, and apply an intermediate bandwidth $BW_I$ between the pull-in bandwidth $BW_P$ and target bandwidth $BW_T$. The intermediate bandwidth $BW_I$ is greater than the target bandwidth $BW_T$ and less than the pull-in bandwidth $BW_P$. By these means, the CDR circuit 322 is controlled to prioritize the pull-in frequency range in a pull-in mode initially to function properly, and then be fine-tuned in an intermediate track mode to satisfy the jitter tolerance gradually, thereby addressing the pull-in frequency range and jitter tolerance issues separately.

Figure 5:
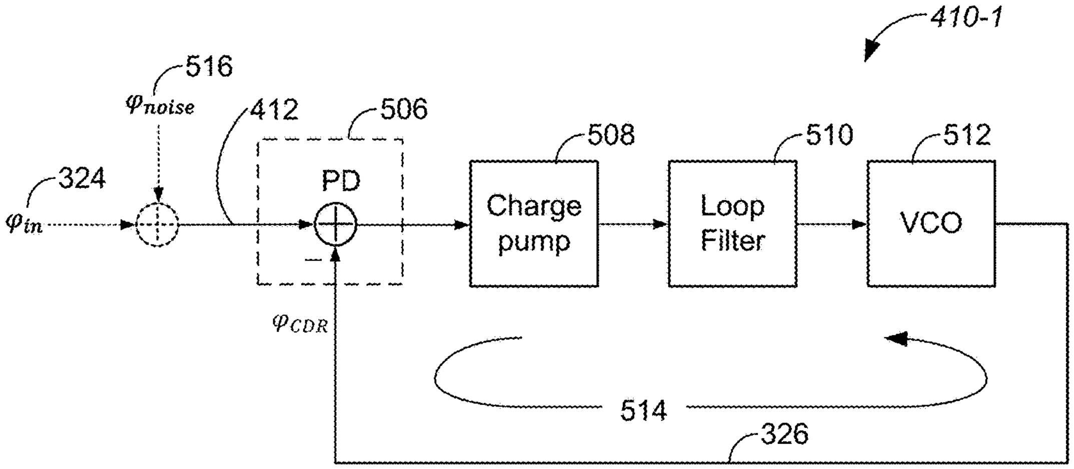
FIG. 5 is a block diagram of example PLL-based clock recovery circuit having a CDR loop, in accordance with some implementations.

FIG. 5 is a block diagram of example PLL-based clock recovery circuit 410-1 having a CDR loop 514, in accordance with some implementations. The clock recovery circuit 410-1 is configured to receive a data signal 412 and recover a clock signal 326 from the data signal 412, and the data signal 412 carries a stream of data bits according to a reference clock frequency $f_{RC}$. The data signal 412 includes an embedded clock signal 324 (e.g., in FIG. 3) having the reference clock frequency $f_{RC}$ and a phase noise 516 incorporated in the corresponding data communication channel. The clock recovery circuit 410-1 includes a phase detector 506, a charge pump 508, a loop filter 510, and a voltage controlled oscillator (VCO) 512. Electronic components 506-512 of the clock recovery circuit 410-1 form a CDR loop 514. The phase detector 506 is configured to detect a phase difference between the embedded clock signal 324 of the data signal 412 and the recovered clock signal 326. The charge pump 508 is coupled to the phase detector 506, and the loop filter 510 is coupled to the charge pump 508. In an example, the loop filter 510 includes a low pass filter. An output voltage of the filter 510 includes a DC voltage level that is correlated with the phase difference between the clock signal 324 of the data signal 412 and the clock signal 326. The VCO 512 is coupled to the filter 510 and configured to in response to the output voltage of the filter 510, generate the clock signal 326 having a recovered clock frequency that is correlated with the DC voltage level of the output voltage of the filter 510. The clock frequency of the clock signal 326 is reversely related to the phase difference between the clock signal 324 of the data signal 412 and the clock signal 326. The greater the phase difference, the further the recovered clock frequency from the reference clock frequency $f_{RC}$; and the smaller the phase difference, the closer the recovered clock frequency to the reference clock frequency $f_{RC}$.

In some implementations, the charge pump 508 and loop filter 510 are re-configured to adjust a bandwidth of the CDR circuit 322. When the phase noise 516 is added onto an input phase of the clock signal 324, an increase of the bandwidth of the CDR circuit 322 causes a phase of the recovered clock signal 326 generated by the VCO 512 to track the phase noise 516, thereby increasing a clock jitter noise and a BER when the recovered clock signal 326 is used to sample the data signal 412. Conversely, if the CDR bandwidth is reduced to a certain degree, a large initial frequency or phase difference would prevent the CDR loop 514 from locking the recovered clock frequency of the clock signal 326 onto the reference clock frequency $f_{RC}$ of the clock signal 324. The CDR circuit 322 remains operational if the amount of an initial frequency or phase difference between the recovered clock signal 326 and the clock signal 324 of the data signal 412 is controlled within a pull-in frequency range. Example sources of the phase noise 516 include one or more of: inter-symbol interference (ISI), cross-talk, supply noise, any noise generated by electronic components coupled along a signal path from the transmitter IC 402 to the phase detector 506, and the like.

Figure 6:
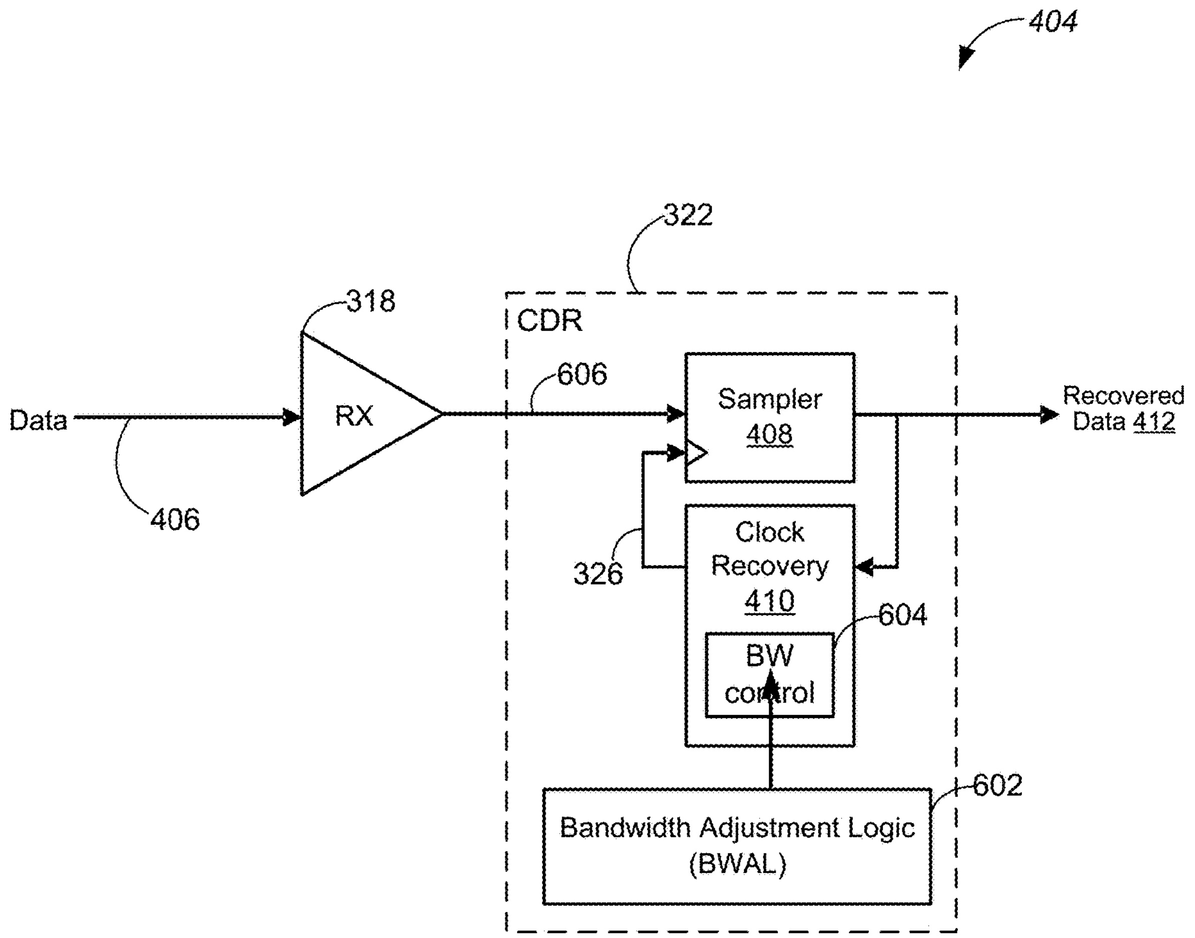
FIG. 6 is a block diagram of example receiver IC having a bandwidth adjustment logic, in accordance with some implementations.

FIG. 6 is a block diagram of example receiver IC 404 having a bandwidth adjustment logic 602, in accordance with some implementations. The receiver IC 404 includes a receiver 318 and CDR circuit 322, and is configured to generate an output data signal 412 including the stream of data bits. In some implementations, the receiver 318 includes an analog front end applying one or more analog equalizers to compensate for a loss from the data channel 225. The CDR circuit 322 further includes a sampler 408 and a clock recovery circuit 410. The CDR circuit 322 is configured to recover a clock signal 326, which is used by the sampler 408 to sample a signal 606 carrying the stream of data bits coded according to a reference clock frequency $f_{RC}$. The clock recovery circuit 410 detects a phase difference of the data signal 412 and the clock signal 326, and adjusts a clock frequency of the clock signal 326 to reduce the phase difference based on a negative feedback loop (e.g., implemented by a CDR loop 514 in FIG. 5).

In some implementations, the clock recovery circuit 410 includes a bandwidth controller 604 configured to control a bandwidth of the clock recovery circuit 410. Further, in some implementations (FIGS. 5 and 8), the charge pump 508 and loop filter 510 are re-configured to adjust the bandwidth of the clock recovery circuit 410, and the bandwidth controller 604 is coupled to the charge pump 508 and loop filter 510 to control the bandwidth of the clock recovery circuit 410. In an example, the loop filter 510 includes a resistor-capacitor network made of one or more resistors and one or more capacitors. The bandwidth controller 604 selects one of different combinations of the one or more resistors and one or more capacitors in accordance with the bandwidth of the clock recovery circuit 410. Alternatively, in some implementations (FIG. 9), the clock recovery circuit 410 includes a digital CDR circuit defined according to a plurality of digital filter coefficients. The bandwidth controller 604 selects one of the plurality of digital filter coefficients in accordance with the bandwidth of the clock recovery circuit 410.

In some implementations, the bandwidth controller 604 of the clock recovery circuit 410 includes, or is coupled to, the bandwidth adjustment logic 602. The bandwidth adjustment logic 602 is configured to provide settings that allow the bandwidth controller 604 to control the clock recovery circuit to start with a pull-in bandwidth $BW_P$, settle at a target bandwidth $BW_T$, and apply an intermediate bandwidth $BW_I$ between the pull-in bandwidth $BW_P$ and target bandwidth $BW_T$. The intermediate bandwidth $BW_I$ is greater than the target bandwidth $BW_T$ and less than the pull-in bandwidth $BW_P$. The bandwidth adjustment logic 602 enables simultaneous optimization of the pull-in frequency range and jitter tolerance. Specifically, the bandwidth adjustment logic 602 of the bandwidth controller 604 initially sets the bandwidth of the CDR loop 514 according to the pull-in frequency range, and after frequency locking, gradually reduces the bandwidth of the CDR loop 514 to control a jitter of the clock signal 326 within a jitter tolerance while maintaining locking of the clock frequency of the clock signal 326.

The bandwidth of the CDR loop 514 is not constant. Instead, the bandwidth of the CDR loop 514 is adjusted according to a plurality of stages, such that both the pull-in frequency range and the CDR jitter satisfy corresponding requirements. The plurality of stages corresponds to a temporal sequence of a pull-in mode, an intermediate track mode, and a target track mode. Frequency locking occurs in the pull-in mode in which a difference between frequencies of the clock signal 324 of the data signal 412 and the recovered clock signal 326 is large, e.g., greater than the intermediate bandwidth $BW_I$ or the target bandwidth $BW_T$. The bandwidth of the CDR loop 514 is controlled to have the pull-in bandwidth $BW_P$ (which is greater than $BW_I$ and $BW_T$) to widen the pull-in frequency range. After frequency locking is acquired or if frequencies of the clock signal 324 of the data signal 412 and the recovered clock signal 326 are sufficiently close to each other (e.g., smaller than a locking difference), the bandwidth of the CDR loop 514 is reduced in the intermediate track mode and the target track mode to control the jitter in the recovered clock signal 326.

Figure 7A:
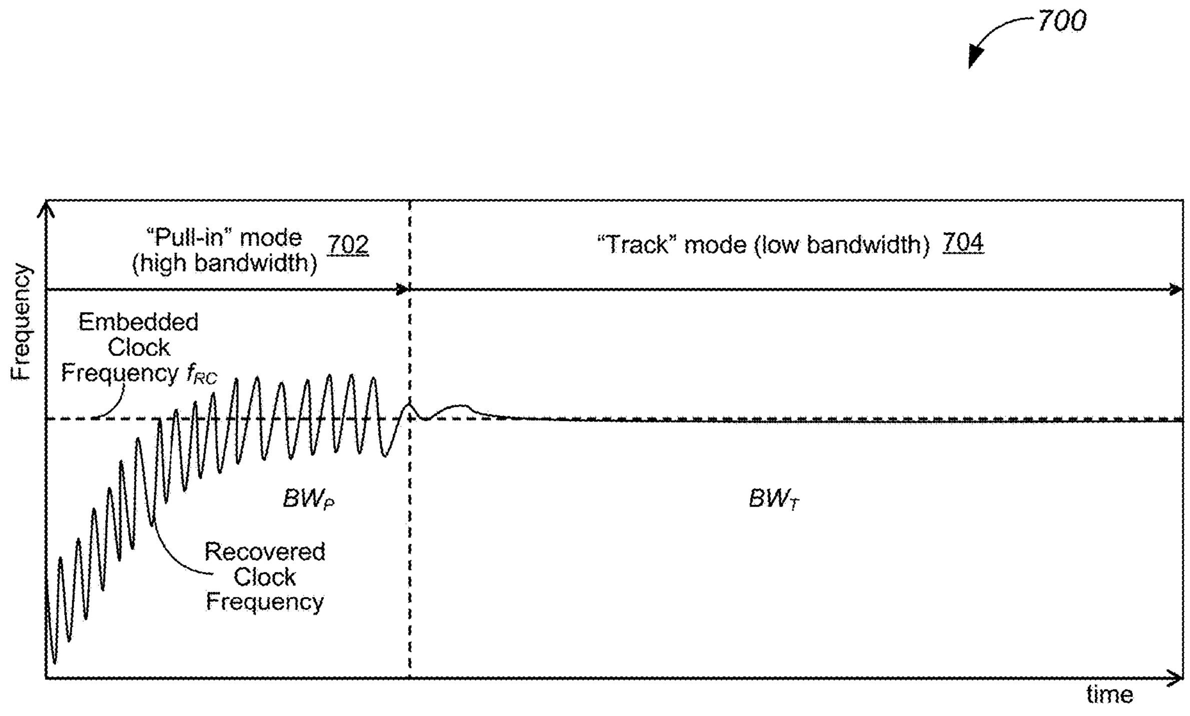
FIG. 7A is a temporal diagram of an example clock frequency of a recovered clock signal during lock acquisition and normal operation, in accordance with some implementations.
Figure 7B:
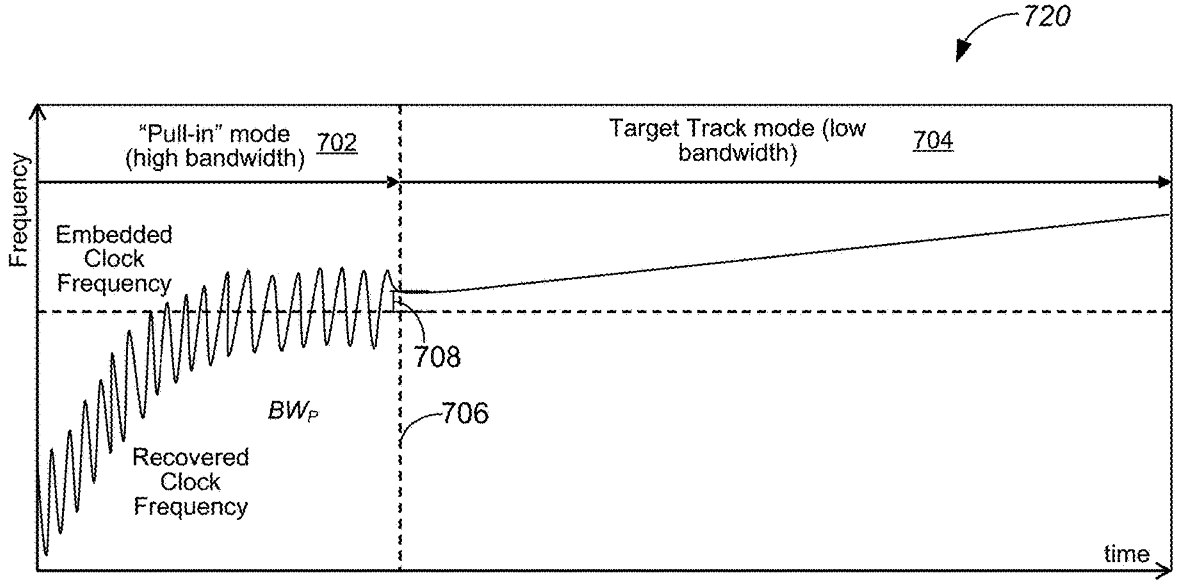
FIG. 7B is a temporal diagram of another example clock frequency of a recovered clock signal that loses frequency locking, in accordance with some implementations.
Figure 7C:
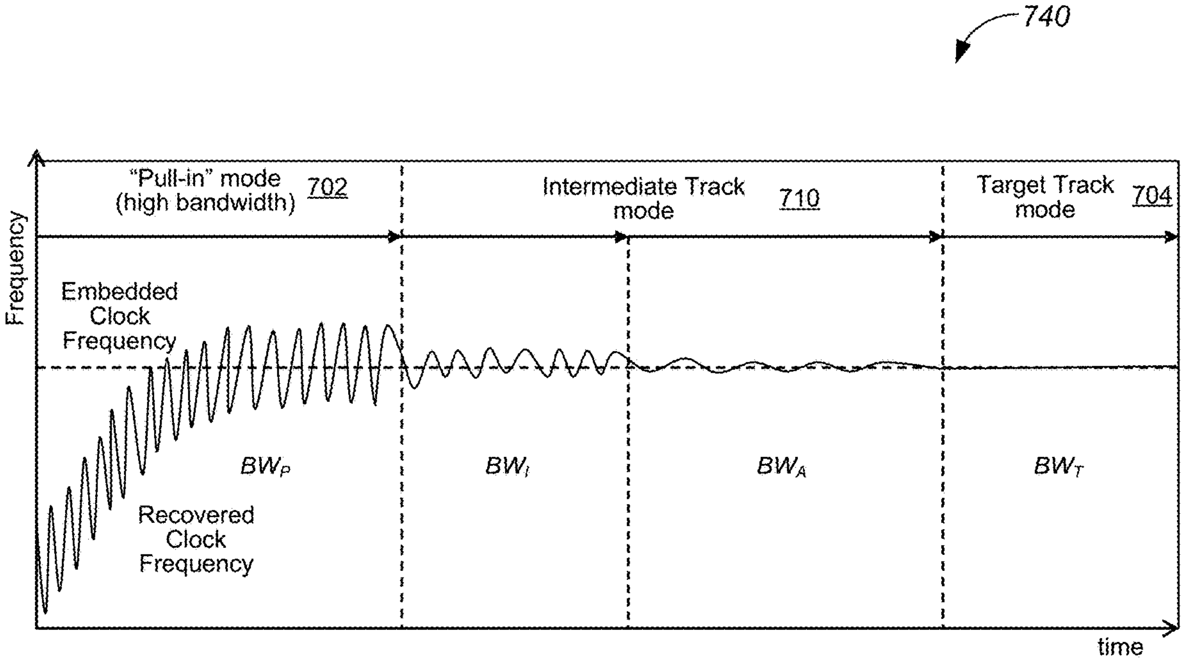
FIG. 7C is a temporal diagram of another example clock frequency of a recovered clock signal during lock acquisition, an intermediate mode, and for normal operation, in accordance with some implementations.

FIG. 7A is a temporal diagram 700 of an example clock frequency of a recovered clock signal 326 during lock acquisition and normal operation, in accordance with some implementations. FIG. 7B is a temporal diagram 720 of another example clock frequency of a recovered clock signal 326 that loses frequency locking, in accordance with some implementations. FIG. 7C is a temporal diagram 740 of another example clock frequency of a recovered clock signal 326 during a pull-in mode, an intermediate mode, and for normal operation, in accordance with some implementations. Lock acquisition and normal operation correspond to a pull-in mode 702 and a target track mode 704. In the pull-in mode 702, a frequency of the clock signal 326 starts within the pull-in bandwidth $BW_P$ and increases within a pull-in frequency range of the reference clock frequency $f_{RC}$ (i.e., a frequency of the clock signal 324 of the data signal 412) to gradually approach the reference clock frequency $f_{RC}$. The pull-in bandwidth $BW_P$ is determined based on the pull-in frequency range. In the target track mode 704, the clock signal 326 is generated within a target bandwidth of the reference clock frequency $f_{RC}$ (i.e., a frequency of the clock signal 324 of the data signal 412). In some implementations, the clock signal 326 has a jitter within a target jitter tolerance in the target track mode 704, and the target bandwidth $BW_T$ is determined based on the target jitter tolerance. In some implementations, data recovered from the data signal 412 using the clock signal 326 has a BER within a target BER tolerance, and the target bandwidth is determined based on the target BER tolerance.

Referring to FIG. 7A, in some implementations, when the clock recovery circuit 410 is initiated, the recovered clock signal 326 has an offset with the clock signal 324 of the data signal 412 in frequency, in phase, or both, and the offset is optionally greater than a threshold offset. The pull-in bandwidth $BW_P$ of the CDR loop 514 is set at a high level accordingly. Once frequency locking is acquired (e.g., the clock frequency of the clock signal 326 is locked to vary within a predefined range of the reference clock signal $f_{RC}$ of the data signal 412), the clock recovery circuit 410 is controlled by the bandwidth controller 604 to exit the pull-in mode 702 and start the target track mode 704. Specifically, the bandwidth controller 604 controls settings of the CDR loop (e.g., resistance and capacitance of a filter 510 (FIG. 5)) to reduce its bandwidth to the target bandwidth $BW_T$ that is less than the pull-in bandwidth $BW_P$. In the target track mode 704, the CDR circuit 410 does not provide the pull-in frequency range any more, and however, is configured to track small deviations of the clock frequency of the clock signal 326. In the target track mode 704, the jitter of the clock signal 326 is reduced compared with in the pull-in mode 702, so is the BER for the data recovered from the data signal 412 using the clock signal 326.

Referring to FIG. 7B, in some situations, frequency locking is acquired in the pull-in mode 702, but cannot be retained when the clock recovery circuit 410 switches to the target mode 704. This happens because the pull-in bandwidth $BW_P$ corresponding to the pull-in mode 702 is relatively high or the target bandwidth $BW_T$ corresponding to the track mode 704 is relatively low. At an instant of mode switching 706, the target bandwidth $BW_T$ of the target track mode 704 is insufficient to pull in an frequency offset 708. The CDR circuit 410 fails to lock the frequency of the clock signal 326 with respect to the reference clock frequency $f_{RC}$. More specifically, in the pull-in mode 702, the pull-in bandwidth $BW_P$ results in a clock signal 326 having ripples that are greater than a frequency variation threshold. At the instant of mode switching 706, a residual offset associated with these ripples exceeds a small pull-in frequency range associated with the target track mode 704, and is difficult to be overcome by the relatively small target bandwidth $BW_T$ in the target track mode 704. As such, the frequency of the clock signal 326 would probably diverge from the reference clock frequency $f_{RC}$ of the data signal 412.

Referring to FIG. 7C, in some implementations, an intermediate track mode 710 is applied between the pull-in mode 702 and the target track mode 704. In the intermediate track mode 710, an intermediate bandwidth $BW_I$ immediately follows the pull-in bandwidth $BW_P$. Data recovered from the data signal using the clock signal 326 has a BER that is greater than the target BER tolerance associated with the target track mode 704. In some implementations not shown, the target bandwidth $BW_T$ immediately follows the intermediate bandwidth $BW_I$, which immediately follows the pull-in bandwidth $BW_P$. Further, in an example, the intermediate bandwidth $BW_I$ is an average of the pull-in bandwidth $BW_P$ and the target bandwidth $BW_T$. In another example, a logarithm to the intermediate bandwidth $BW_I$ is an average of a logarithm value to the pull-in bandwidth $BW_P$ and a logarithm value to the target bandwidth $BW_T$. In yet another example, a natural logarithm to the intermediate bandwidth $BW_I$ is an average of a natural logarithm value to the pull-in bandwidth $BW_P$ and a natural logarithm value to the target bandwidth $BW_T$.

In some implementations, in addition to the intermediate bandwidth $BW_I$, the bandwidth controller 604 controls the clock recovery circuit 410 to apply one or more additional bandwidths $BW_A$ between the pull-in bandwidth $BW_P$ and the target bandwidth $BW_T$. The intermediate bandwidth $BW_I$ and the one or more additional bandwidths $BW_A$ are sequentially applied to the clock recovery circuit 410 between the pull-in bandwidth $BW_P$ and the target bandwidth $BW_T$. In an example, the pull-in bandwidth $BW_P$, intermediate bandwidth $BW_I$, one or more additional bandwidths $BW_A$, and target bandwidth $BW_T$ form an arithmetic sequence or geometric sequence. In another example, logarithm values (e.g., natural logarithm values) of the pull-in bandwidth $BW_P$, intermediate bandwidth $BW_I$, one or more additional bandwidths $BW_A$, and target bandwidth $BW_T$ form an arithmetic sequence or geometric sequence. Bandwidth transition from the pull-in bandwidth $BW_P$ and the target bandwidth $BW_T$ is controlled to be more gradual in clock recovery, e.g., into the plurality of stages each corresponding to a portion of a difference between the pull-in bandwidth $BW_P$ and the target bandwidth $BW_T$. When the bandwidth change between two successive bandwidths is sufficiently small, e.g., lower than a bandwidth variation threshold, the clock recovery circuit 410 keeps lock the recovered clock frequency of the clock signal 326 with respect to the reference clock frequency $f_{RC}$.

Stated another way, in some implementations, a sequence of distinct bandwidths includes the intermediate bandwidth, and is applied sequentially between the pull-in bandwidth $BW_P$ and the target bandwidth $BW_T$ (e.g., in the intermediate track mode). The sequence of distinct bandwidths includes a total number of bandwidths, and each bandwidth has a respective bandwidth value. The total number and respective bandwidth values of the sequence of distinct bandwidths are programmable according to a bandwidth selection rule. Further, in some implementations, each of the pull-in bandwidth $BW_P$, the intermediate bandwidth $BW_I$, the one or more additional bandwidths $BW_A$, and the target bandwidth $BW_T$ is programmable.

Figure 8:
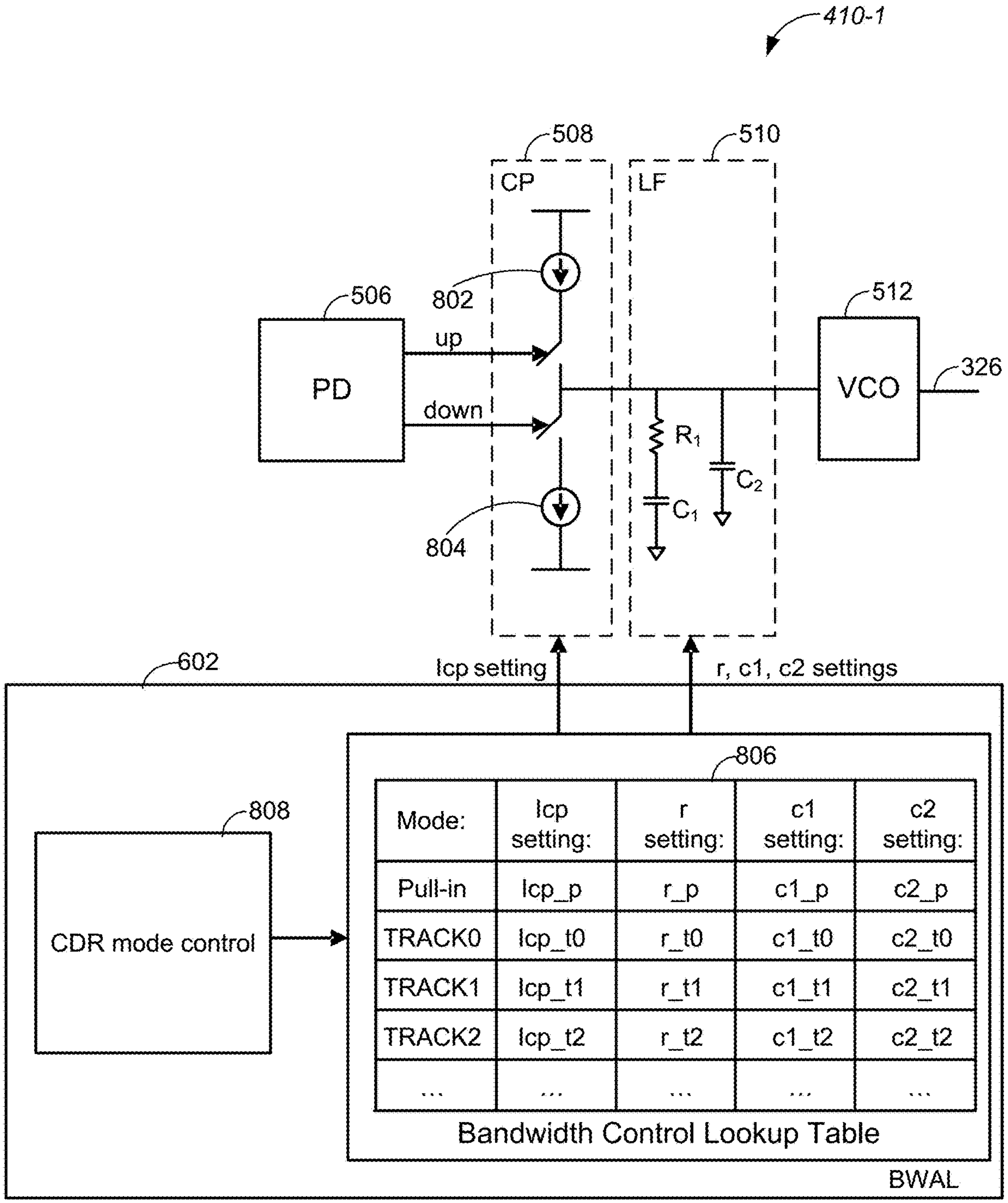
FIG. 8 is a schematic diagram of example clock recovery circuit coupled to a bandwidth adjustment logic, in accordance with some implementations.

FIG. 8 is a schematic diagram of PLL-based clock recovery circuit 410-1 coupled to a bandwidth adjustment logic 602, in accordance with some implementations. For brevity, the CDR loop 514 is omitted in FIG. 8. The clock recovery circuit 410-1 includes a charge pump 508 including a current source 802 and a current drain 804, a low pass filter 510 including one or more resistors R (e.g., $R_1$) and one or more capacitors C (e.g., $C_1$ and $C_2$), and a VCO 512 coupled to the low pass filter 510 and configured to output the clock signal 326. At least a subset of the current source 802, current drain 804, one or more resistors R, and one or more capacitors C is adjusted by a bandwidth controller 604 (not shown) to enable the clock recovery circuit 410-1 to operate with the pull-in bandwidth $BW_P$, the intermediate bandwidth $BW_I$, and the target bandwidth $BW_T$. In some implementations, the bandwidth adjustment logic 602 includes, or is coupled to, memory storing a lookup table 806.

The lookup table 806 stores a plurality of rows. Each row corresponds to a respective one of the pull-in bandwidth $BW_P$, the intermediate bandwidth $BW_I$, the one or more additional bandwidths $BW_I$(if any), and the target bandwidth $BW_T$, and defines at least corresponding settings for the subset of the current source 802, current drain 804, one or more resistors R, and one or more capacitors C. In some implementations, the bandwidths and corresponding settings available in the lookup table 806 are determined based on simulation, silicon measurement, and calibration. In some implementations, the bandwidths and corresponding settings available in the lookup table 806 are programmable. By these means, the pull-in frequency range and jitter tolerance of the clock recovery circuit 410-1 can satisfy corresponding pull-in and jitter requirements, while allowing clock recovery to be implemented efficiently and with a high success rate.

Referring to FIG. 8, in some implementations, the bandwidth adjustment logic 602 includes a CDR mode control logic 808 configured to select an operation mode in which the clock recovery circuit 410-1 should currently operate (e.g. a pull-in mode, an intermediate track mode (TRACK0, TRACK1, TRACK2 . . . ), a target track mode). The lookup table 806 sends the settings corresponding to the selected operation mode to the charge pump 508 and loop filter 510 to adjust the bandwidth of the clock recovery circuit 410-1. In accordance with the lookup table 806, each electronic component of the subset of the current source 802, current drain 804, one or more resistors R, and one or more capacitors C is programmable. Alternatively, in some implementations not shown, the charge pump 508 does not include the current source 802 and current drain 804, and operates according to one or more charge pump parameters. The bandwidth controller 604 controls the one or more charge pump parameters of the charge pump 508 to enable the clock recovery circuit 410-1 to operate with different bandwidths $BW_P$, $BW_I$, and $BW_T$. Further, in some implementations, each row of the lookup table 806 defines the one or more charge pump parameters of the charge pump 508 in place of the settings for the current source 802 and current drain 804 of the charge pump 508.

Figure 9:
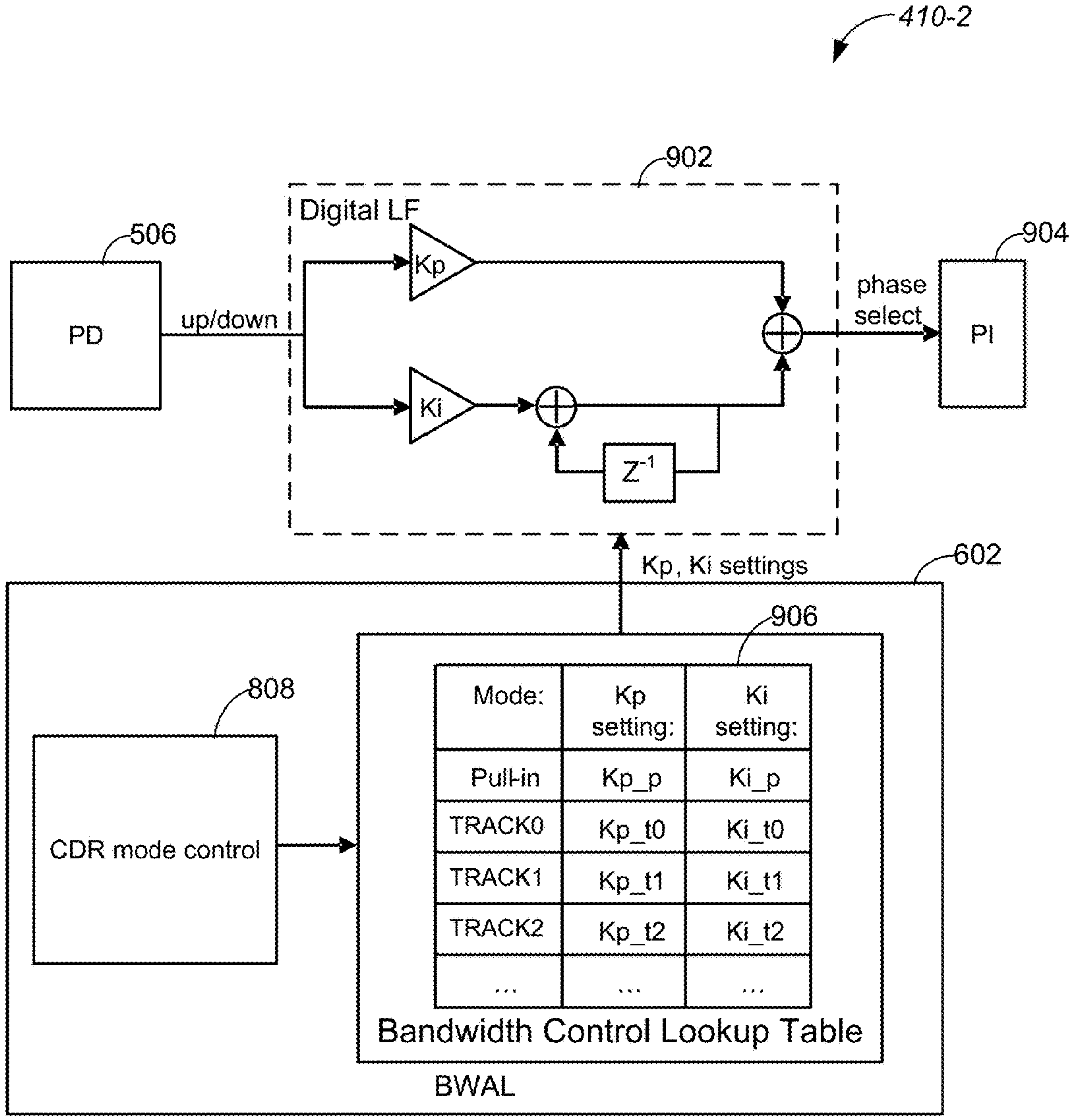
FIG. 9 is a schematic diagram of example clock recovery circuit coupled to a bandwidth adjustment logic, in accordance with some implementations.

FIG. 9 is a schematic diagram of PI-based clock recovery circuit 410-2 coupled to a bandwidth adjustment logic 602, in accordance with some implementations. For brevity, the CDR loop 514 is omitted in FIG. 9. The PI-based clock recovery circuit 410-2 includes a phase detector 506, a digital filter 902, and a phase interpolator 904. The digital filter 902 is defined by a plurality of filter parameters. The phase interpolator 904 is coupled to the digital filter 902 and configured to select a phase of the clock signal 326 dynamically. At least a subset of the plurality of filter parameters are adjusted by the bandwidth adjustment logic 602 (e.g., in the bandwidth controller 604 in FIG. 6) to enable the clock recovery circuit 410-2 to operate with the pull-in bandwidth $BW_P$, the intermediate bandwidth $BW_I$, the one or more additional bandwidths $BW_A$, and the target bandwidth $BW_T$. In some implementations, the bandwidth adjustment logic 602 includes, or is coupled to, memory storing a lookup table 906.

In some implementations, the lookup table 906 stores a plurality of rows. Each row corresponds to a respective one of the pull-in bandwidth $BW_P$, the intermediate bandwidth $BW_I$, the one or more additional bandwidths $BW_A$ (if any), and the target bandwidth $BW_T$, and defines at least corresponding settings for the subset of the plurality of filter parameters (e.g., $K_p$ and $K_i$). For example, the filter parameters $K_p$ and $K_i$ are adjusted by the bandwidth adjustment logic 602, such that the pull-in frequency range and jitter tolerance of the clock recovery circuit 410-2 can satisfy corresponding pull-in and jitter requirements in the pull-in mode and the target track mode, respectively. In some implementations, the bandwidths and corresponding settings available in the lookup table 906 are determined based on simulation, silicon measurement, and calibration. In some implementations, the bandwidths and corresponding settings for the filter parameters available in the lookup table 906 are programmable. By these means, the pull-in frequency range and jitter tolerance of the clock recovery circuit 410-2 can satisfy corresponding pull-in and jitter requirements, while allowing clock recovery to be implemented efficiently and with a high success rate.

Referring to FIG. 9, in some implementations, the bandwidth adjustment logic 602 includes a CDR mode control logic 808 configured to select an operation mode in which the clock recovery circuit 410-2 operates (e.g. a pull-in mode, an intermediate track mode (TRACK0, TRACK1, TRACK2 . . . ), a target track mode). The lookup table 906 sends the settings corresponding to the selected operation mode to the digital filter 902 to adjust the bandwidth of the clock recovery circuit 410-2. In accordance with the lookup table 906, each filter parameter of the digital filter 902 is programmable.

Figure 10:
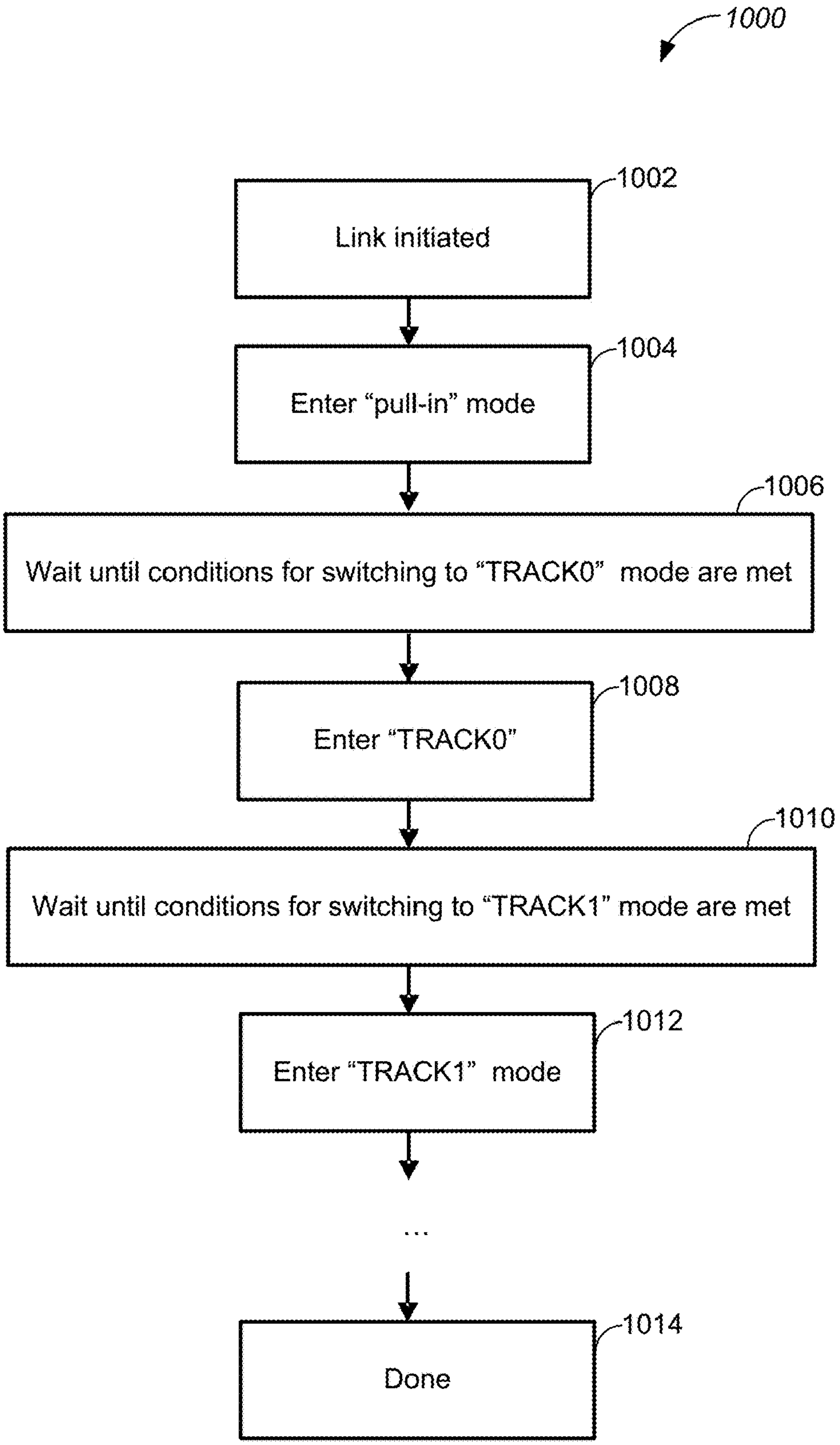
FIG. 10 is a flow diagram of a process of controlling clock recovery for a data link of an electronic system, in accordance with some implementations.

FIG. 10 is a flow diagram of a process 1000 of controlling clock recovery for a data link 106 of an electronic system 100, in accordance with some implementations. The data link 106 includes clock recovery circuit 410 and a bandwidth controller 604. The clock recovery circuit 410 is configured to receive a data signal 412 and recover a clock signal 326 from the data signal 412, and the data signal 412 carries a stream of data bits according to a reference clock frequency $f_{RC}$. The bandwidth controller 604 is coupled to the clock recovery circuit 410. The bandwidth controller 604 includes, or is coupled to, a bandwidth adjustment logic 602. The bandwidth controller 604 (specifically, the bandwidth adjustment logic 602) is configured to control the clock recovery circuit 410 to start with a pull-in bandwidth $BW_P$, settle at a target bandwidth $BW_T$, and apply an intermediate bandwidth $BW_I$ between the pull-in bandwidth $BW_P$ and target bandwidth $BW_T$. The intermediate bandwidth $BW_I$ is greater than the target bandwidth $BW_T$ and less than the pull-in bandwidth $BW_P$. In some implementations, the bandwidth controller 604 is configured to control the clock recovery circuit 410 to apply one or more additional bandwidths $BW_A$ between the intermediate bandwidth $BW_I$ and the target bandwidth $BW_T$. The intermediate bandwidth $BW_I$ and the one or more additional bandwidths $BW_A$ are sequentially applied to the clock signal recovery circuit after the pull-in bandwidth $BW_P$ and before the target bandwidth $BW_T$. The intermediate bandwidth $BW_I$ and additional bandwidths $BW_A$ (if any) correspond to an intermediate track mode 710 including different lower modes, e.g., TRACK0 mode, TRACK1 mode.

In accordance with the process 1000, the data link 106 is initiated (1002). A CDR mode control logic 808 (FIGS. 8 and 9) immediately places (1004) the CDR circuit 322 in a pull-in mode 702 (FIG. 7C). In some implementations, the pull-in frequency range is maximized. The CDR mode control logic 808 then waits (1006) for a first track switching condition to be satisfied. In accordance with a determination that the first track switching condition is satisfied, the CDR mode control logic 808 terminates the pull-in mode 702 and restarts (1008) the TRACK0 mode. In some implementations, in the TRACK0 mode, settings of the clock recovery circuit 410 are updated to reduce the bandwidth of the clock recovery circuit 410 from the pull-in bandwidth $BW_P$ to the intermediate bandwidth $BW_I$. In some implementations, the first track switching condition is satisfied when the bandwidth of the clock recovery circuit 410 drops below the intermediate bandwidth $BW_I$. Alternatively, in some implementations, the first track switching condition is satisfied when a predetermined duration of time has passed since an initiation 1002 of the data link 106.

Further, in some implementations, the TRACK0 mode corresponds to the intermediate bandwidth $BW_I$, and the TRACK1 mode following the TRACK0 mode corresponds to an additional bandwidth $BW_A$. The CDR mode control logic 808 then waits (1010) for a second track switching condition to be satisfied. In accordance with a determination that the second track switching condition is satisfied, the CDR mode control logic 808 terminates the TRACK0 mode and restarts (1012) the TRACK1 mode. In some implementations, in the TRACK1 mode, the settings of the clock recovery circuit 410 are updated to reduce the bandwidth of the clock recovery circuit 410 from the intermediate bandwidth $BW_I$ to the additional bandwidth $BW_A$. In some implementations, the second track switching condition is satisfied when the bandwidth of the clock recovery circuit 410 drops below the additional bandwidth $BW_A$. Alternatively, in some implementations, the second track switching condition is satisfied when a corresponding predetermined duration of time has passed since an initiation of the corresponding TRACK0 mode. In each of the TRACK0 and TRACK1 modes, the settings of the clock recovery circuit 410 are configured such that the jitter tolerance satisfies a respective jitter tolerance requirement (e.g., is minimized, is below a corresponding jitter tolerance threshold). In some implementations, operations 1001-1012 repeat for one or more lower track modes (e.g., TRACK1 mode, TRACK2 mode), until the target track mode 704 is reached.

In some implementations, the TRACK0 mode of the intermediate track mode corresponds to the intermediate bandwidth $BW_I$, and the target track mode immediately follows the TRACK0 mode. The CDR mode control logic 808 then waits for a target track switching condition to be satisfied. In accordance with a determination that the target track switching condition is satisfied, the CDR mode control logic 808 terminates the TRACK0 mode of the intermediate track mode and starts the target track mode 704. In some implementations, in the target track mode 704, the settings of the clock recovery circuit 410 are updated to reduce the bandwidth of the clock recovery circuit 410 from the intermediate bandwidth $BW_I$ to the target bandwidth $BW_T$. In some implementations, the second track switching condition is satisfied when the bandwidth of the clock recovery circuit 410 drops below the target bandwidth $BW_T$. Alternatively, in some implementations, the first track switching condition is satisfied when a corresponding predetermined duration of time has passed since an initiation of the intermediate track mode 704.

Figure 11:
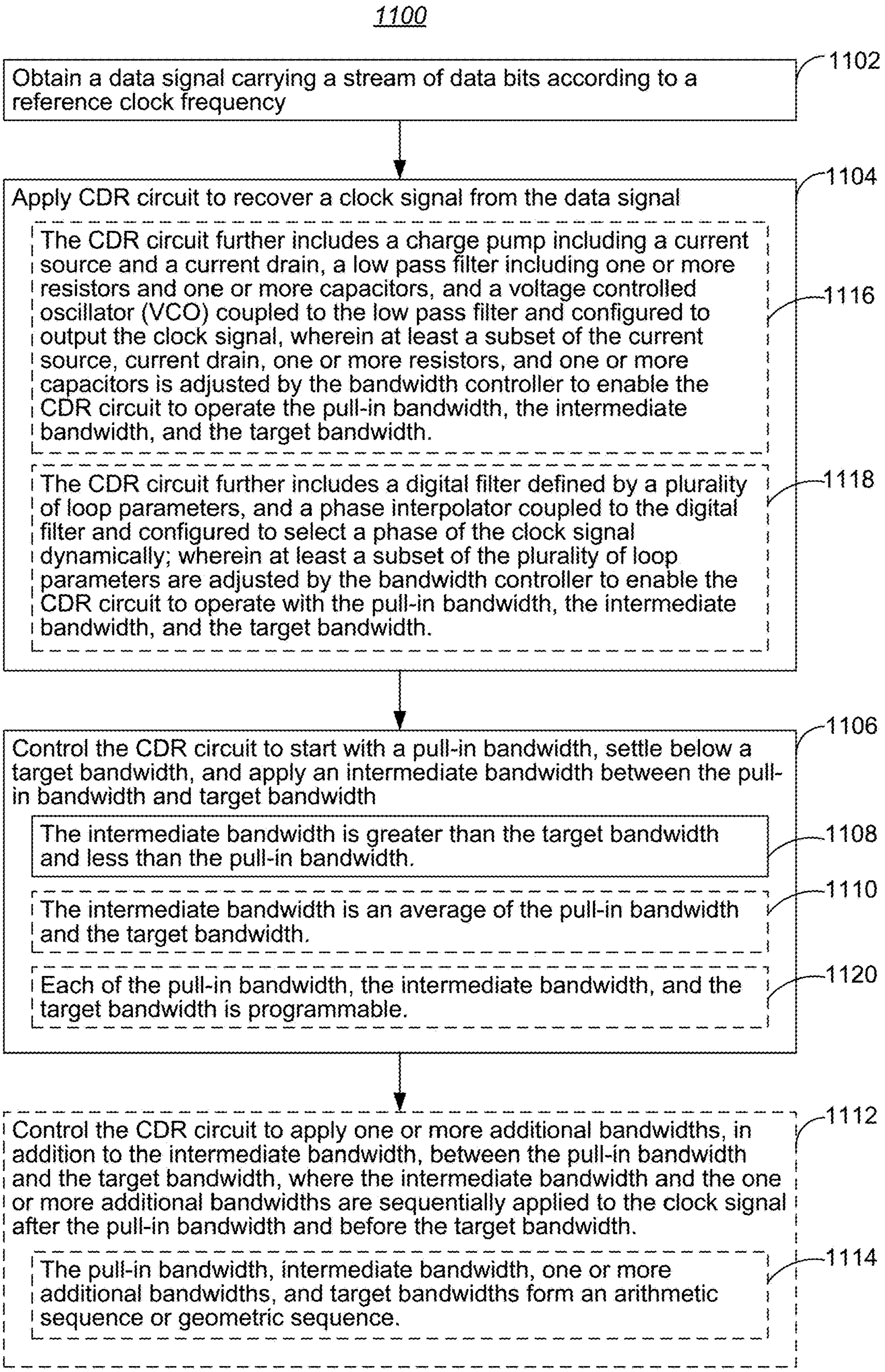
FIG. 11 is a flow diagram of an example method for controlling clock data recovery for a data communication channel, in accordance with some implementations.

FIG. 11 is a flow diagram of an example method 1100 for controlling clock data recovery for a data communication channel, in accordance with some implementations. For convenience, the method 1100 is described as being implemented by an electronic device. The electronic device obtains (1102) a data signal 412 carrying a stream of data bits according to a reference clock frequency $f_{RC}$ and applies (1104) clock recovery circuit 410 to recover a clock signal 326 from the data signal 412. The clock recovery circuit 410 is controlled (1106) to start with a pull-in bandwidth $BW_P$, settle below a target bandwidth $BW_T$, and apply an intermediate bandwidth $BW_I$ between the pull-in bandwidth $BW_P$ and target bandwidth $BW_T$. The intermediate bandwidth $BW_I$ is (1108) greater than the target bandwidth $BW_T$ and less than the pull-in bandwidth $BW_P$. In some implementations, a bandwidth controller 604 determines the intermediate bandwidth $BW_I$, such that the intermediate bandwidth $BW_I$ is (1110) an average of the pull-in bandwidth $BW_P$ and the target bandwidth $BW_T$.

In some implementations, the clock recovery circuit 410 operates in a target track mode 704, and generates the clock signal 326 within the target bandwidth $BW_T$ of the reference clock frequency. The clock signal 326 has a jitter within a target jitter tolerance. A bandwidth controller 604 determine the target bandwidth $BW_T$ based on the target jitter tolerance. In some implementations, the clock recovery circuit 410 operates in a target track mode 704, and generates the clock signal 326 within the target bandwidth $BW_T$ of the reference clock frequency. Data recovered from the data signal 412 using the clock signal has a BER within a target BER tolerance. A bandwidth controller 604 determine the target bandwidth $BW_T$ based on the target BER tolerance.

In some implementations, the clock recovery circuit 410 operates in a pull-in mode 702 and generates a clock signal 326. A frequency of the clock signal 326 starts within the pull-in bandwidth $BW_P$ and increases within a pull-in frequency range of the reference clock frequency to gradually approach the reference clock frequency. A bandwidth controller 604 determines the pull-in bandwidth $BW_P$ based on the pull-in frequency range.

In some implementations, the clock recovery circuit 410 operates in an intermediate track mode 710 and generates the clock signal 326 within the intermediate bandwidth $BW_I$ of the reference clock frequency. Data recovered from the data signal 412 using the clock signal has a BER that is greater than a target BER tolerance.

In some implementations, the bandwidth controller 604 determines the intermediate bandwidth $BW_I$, such that a logarithm to the intermediate bandwidth $BW_I$ is an average of a logarithm value to the pull-in bandwidth $BW_P$ and a logarithm value to the target bandwidth $BW_T$. In some implementations, the bandwidth controller 604 determines the intermediate bandwidth $BW_I$ such that a natural logarithm to the intermediate bandwidth $BW_I$ is an average of a natural logarithm value to the pull-in bandwidth $BW_P$ and a natural logarithm value to the target bandwidth $BW_T$.

In some implementations, a bandwidth controller 604 controls the clock recovery circuit 410 to apply (1112) one or more additional bandwidths between the intermediate bandwidth $BW_I$ and the target bandwidth $BW_T$. The intermediate bandwidth $BW_I$ and the one or more additional bandwidths are sequentially applied to the clock recovery circuit 410 after the pull-in bandwidth $BW_P$ and before the target bandwidth $BW_T$. Further, in some implementations, the pull-in bandwidth $BW_P$, intermediate bandwidth $BW_I$, one or more additional bandwidths, and target bandwidth $BW_T$ form (1114) an arithmetic sequence or geometric sequence. In some implementations, logarithm values of the pull-in bandwidth $BW_P$, intermediate bandwidth $BW_I$, one or more additional bandwidths, and target bandwidth $BW_T$ form an arithmetic sequence or geometric sequence. In some implementations, natural logarithm values of the pull-in bandwidth $BW_P$, intermediate bandwidth $BW_I$, one or more additional bandwidths, and target bandwidth $BW_T$ form an arithmetic sequence or geometric sequence.

In some implementations, a sequence of distinct bandwidths includes the intermediate bandwidth $BW_I$, and is applied sequentially between the pull-in bandwidth $BW_P$ and the target bandwidth $BW_T$ by the clock recovery circuit 410. The sequence of distinct bandwidths includes a total number of bandwidths, and each bandwidth has a respective bandwidth value. The total number and respective bandwidth values of the sequence of distinct bandwidths are programmable according to a bandwidth selection rule.

In some implementations, the clock recovery circuit 410 further includes (1116) a charge pump including a current source and a current drain, a low pass filter including one or more resistors and one or more capacitors, and a voltage controlled oscillator (VCO) coupled to the low pass filter and configured to output the clock signal 326. At least a subset of the current source, current drain, one or more resistors, and one or more capacitors is adjusted by a bandwidth controller 604 to enable the clock recovery circuit 410 to operate with the pull-in bandwidth $BW_P$, the intermediate bandwidth $BW_I$, and the target bandwidth $BW_T$. Further, in some implementations, a lookup table is stored in memory. The lookup table stores a plurality of rows. Each row corresponds to a respective one of the pull-in bandwidth $BW_P$, the intermediate bandwidth $BW_I$, and the target bandwidth $BW_T$ and defines at least corresponding settings for the subset of the current source, current drain, one or more resistors, and one or more capacitors.

In some implementations, the clock recovery circuit 410 further includes (1118) a digital filter defined by a plurality of filter parameters, and a phase interpolator coupled to the digital filter and configured to select a phase of the clock signal 326 dynamically. At least a subset of the plurality of filter parameters are adjusted by the bandwidth controller 604 to enable the clock recovery circuit 410 to operate with the pull-in bandwidth $BW_P$, the intermediate bandwidth $BW_I$, and the target bandwidth $BW_T$. Further, in some implementations, a lookup table is stored in memory. The lookup table stores a plurality of rows. Each row corresponds to a respective one of the pull-in bandwidth $BW_P$, the intermediate bandwidth $BW_I$, and the target bandwidth $BW_T$ and defines at least corresponding settings for the subset of the plurality of filter parameters.

In some implementations, each of the pull-in bandwidth $BW_P$, the intermediate bandwidth $BW_I$, and the target bandwidth $BW_T$ is (1120) programmable.

In some implementations, the pull-in bandwidth $BW_P$ corresponds to a pull-in mode 702 having a first programmable temporal width, and a bandwidth controller 604 controls the clock recovery circuit 410 to terminate the pull-in mode 702 at an end of the first programmable temporal width.

In some implementations, the intermediate bandwidth $BW_I$ corresponds to an intermediate track mode 710 having a second programmable temporal width. A bandwidth controller 604 controls the clock recovery circuit 410 to terminate the intermediate track mode 710 at an end of the second programmable temporal width.

In some implementations, the pull-in bandwidth $BW_P$ corresponds to a pull-in mode 702, and the intermediate bandwidth $BW_I$ corresponds to an intermediate track mode 710 immediately following the pull-in mode 702. A bandwidth controller 604 switches the clock recovery circuit 410 from the pull-in mode 702 to the intermediate track mode 710 in accordance with a determination that a bandwidth of the clock recovery circuit 410 is lower than the intermediate bandwidth $BW_I$.

In some implementations, the intermediate bandwidth $BW_I$ corresponds to an intermediate track mode 710, and the target bandwidth $BW_T$ corresponds to a target track mode 704 immediately following the intermediate track mode 710. A bandwidth controller 604 switches the clock recovery circuit 410 from the intermediate track mode 710 to the target track mode 704 in accordance with a determination that a bandwidth of the clock signal 326 is lower than the target bandwidth $BW_T$.

It should be understood that the particular order in which the operations in FIG. 11 has been described are merely exemplary and are not intended to indicate that the described order is the only order in which the operations could be performed. One of ordinary skill in the art would recognize various ways to controlling clock data recovery for a data communication channel. Additionally, it should be noted that details of other processes and structures described above with respect to FIGS. 1-10 are also applicable in an analogous manner to method 1100 described above with respect to FIG. 11. For brevity, these details are not repeated here.

In some implementations, method 1100 is, optionally, governed by instructions that are stored in a non-transitory computer readable storage medium and that are executed by one or more processors of the electronic device. Each of the operations shown in FIG. 11 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described implementations. The first electronic device and the second electronic device are both electronic device, but they are not the same electronic device.

The terminology used in the description of the various described implementations herein is for the purpose of describing particular implementations only and is not intended to be limiting. As used in the description of the various described implementations and the appended claims, the singular forms "a" "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electronic device, comprising:

clock recovery circuit configured to receive a data signal and recover a clock signal from the data signal; and a bandwidth controller coupled to the clock recovery circuit, the bandwidth controller configured to control the clock recovery circuit to start with a pull-in bandwidth, settle at a target bandwidth, and apply an intermediate bandwidth between the pull-in bandwidth and target bandwidth.

2. The electronic device of claim 1, wherein:

the data signal carries a stream of data bits according to a reference clock frequency;

the clock recovery circuit has a target track mode in which the clock signal is generated within the target bandwidth of the reference clock frequency and has a jitter within a target jitter tolerance; and the target bandwidth is determined based on the target jitter tolerance.

3. The electronic device of claim 1, wherein:

the data signal carries a stream of data bits according to a reference clock frequency;

the clock recovery circuit has a target track mode in which the clock signal is generated within the target bandwidth of the reference clock frequency;

data recovered from the data signal using the clock signal has a bit error rate (BER) within a target BER tolerance, and the target bandwidth is determined based on the target BER tolerance.

4. The electronic device of claim 1, wherein:

the data signal carries a stream of data bits according to a reference clock frequency;

the clock recovery circuit has a pull-in mode in which a frequency of the clock signal starts within the pull-in bandwidth and increases within a pull-in frequency range of the reference clock frequency to gradually approach the reference clock frequency; and the pull-in bandwidth is determined based on the pull-in frequency range.

5. The electronic device of claim 1, wherein:

the data signal carries a stream of data bits according to a reference clock frequency;

the clock recovery circuit has an intermediate track mode in which the clock signal is generated within the intermediate bandwidth of the reference clock frequency; and data recovered from the data signal using the clock signal has a bit error rate (BER) that is greater than a target BER tolerance.

6. The electronic device of claim 1, wherein the intermediate bandwidth is an average of the pull-in bandwidth and the target bandwidth.

7. The electronic device of claim 1, wherein a logarithm to the intermediate bandwidth is an average of a logarithm value to the pull-in bandwidth and a logarithm value to the target bandwidth.

8. The electronic device of claim 1, wherein the bandwidth controller is configured to control the clock recovery circuit to apply one or more additional bandwidths between the intermediate bandwidth and the target bandwidth, and the intermediate bandwidth and the one or more additional bandwidths are sequentially applied to the clock recovery circuit after the pull-in bandwidth and before the target bandwidth.

9. The electronic device of claim 8, wherein the pull-in bandwidth, intermediate bandwidth, one or more additional bandwidths, and target bandwidth form an arithmetic sequence or geometric sequence.

10. The electronic device of claim 8, wherein logarithm values of the pull-in bandwidth, intermediate bandwidth, one or more additional bandwidths, and target bandwidth form an arithmetic sequence or geometric sequence.

11. The electronic device of claim 1, wherein:

a sequence of distinct bandwidths includes the intermediate bandwidth, and is applied sequentially between the pull-in bandwidth and the target bandwidth;

the sequence of distinct bandwidths includes a total number of bandwidths, and each bandwidth has a respective bandwidth value; and the total number and respective bandwidth values of the sequence of distinct bandwidths are programmable according to a bandwidth selection rule.

12. The electronic device of claim 1, wherein the clock recovery circuit further comprises:

a charge pump including a current source and a current drain;

a low pass filter including one or more resistors and one or more capacitors; and a voltage controlled oscillator (VCO) coupled to the low pass filter and configured to output the clock signal;

wherein at least a subset of the current source, current drain, one or more resistors, and one or more capacitors is adjusted by the bandwidth controller to enable the clock recovery circuit to operate with the pull-in bandwidth, the intermediate bandwidth, and the target bandwidth.

13. The electronic device of claim 12, further comprising memory for storing a lookup table, wherein the lookup table stores a plurality of rows, each row corresponding to a respective one of the pull-in bandwidth, the intermediate bandwidth, and the target bandwidth and defining at least corresponding settings for the subset of the current source, current drain, one or more resistors, and one or more capacitors.

14. The electronic device of claim 1, wherein the clock recovery circuit further comprises:

a digital filter defined by a plurality of filter parameters; and a phase interpolator coupled to the digital filter and configured to select a phase of the clock signal dynamically;

wherein at least a subset of the plurality of filter parameters are adjusted by the bandwidth controller to enable the clock recovery circuit to operate with the pull-in bandwidth, the intermediate bandwidth, and the target bandwidth.

15. The electronic device of claim 14, further comprising memory for storing a lookup table, wherein the lookup table stores a plurality of rows, each row corresponding to a respective one of the pull-in bandwidth, the intermediate bandwidth, and the target bandwidth and defining at least corresponding settings for the subset of the plurality of filter parameters.

16. The electronic device of claim 1, wherein the intermediate bandwidth is greater than the target bandwidth and less than the pull-in bandwidth, and each of the pull-in bandwidth, the intermediate bandwidth, and the target bandwidth is programmable.

17. The electronic device of claim 1, wherein the pull-in bandwidth corresponds to a pull-in mode having a first programmable temporal width, and the bandwidth controller is configured to terminate the pull-in mode at an end of the first programmable temporal width.

18. The electronic device of claim 1, wherein the intermediate bandwidth corresponds to an intermediate track mode having a second programmable temporal width, and the bandwidth controller is configured to terminate the intermediate track mode at an end of the second programmable temporal width.

19. The electronic device of claim 1, wherein:

the pull-in bandwidth corresponds to a pull-in mode, and the intermediate bandwidth corresponds to an intermediate track mode immediately following the pull-in mode; and the bandwidth controller is configured to switch from the pull-in mode to the intermediate track mode in accordance with a determination that a bandwidth of the clock recovery circuit is lower than the intermediate bandwidth.

20. The electronic device of claim 1, wherein:

the intermediate bandwidth corresponds to an intermediate track mode, and the target bandwidth corresponds to a target track mode immediately following the intermediate track mode; and the bandwidth controller is configured to switch from the intermediate track mode to the target track mode in accordance with a determination that a bandwidth of the clock recovery circuit is lower than the target bandwidth.

* * * * *